(12) United States Patent
Shinano et al.

(10) Patent No.: US 8,665,535 B2
(45) Date of Patent: Mar. 4, 2014

(54) LENS BARREL AND IMAGING DEVICE

(75) Inventors: Fumio Shinano, Osaka (JP); Tetsuya Uno, Osaka (JP); Koichiro Hirabayashi, Osaka (JP); Akio Konishi, Hyogo (JP)

(73) Assignee: Panasonic Corporation, Osaka (JP)

( * ) Notice: Subject to any disclaimer, the term of this patent is extended or adjusted under 35 U.S.C. 154(b) by 159 days.

(21) Appl. No.: 12/836,586

(22) Filed: Jul. 15, 2010

(65) Prior Publication Data

US 2011/0019290 A1   Jan. 27, 2011

(30) Foreign Application Priority Data

Jul. 27, 2009   (JP) .................................. 2009-174057
Jul. 27, 2009   (JP) .................................. 2009-174058

(51) Int. Cl.
*G02B 15/14*   (2006.01)

(52) U.S. Cl.
USPC ......................................................... 359/700

(58) Field of Classification Search
USPC .......... 359/694–706, 811, 817, 822, 823–826
See application file for complete search history.

(56) References Cited

U.S. PATENT DOCUMENTS

| 4,322,151 | A | * | 3/1982 | Weiss ................................ 396/72 |
| 5,216,549 | A | * | 6/1993 | Notagashira et al. ......... 359/703 |
| 6,198,578 | B1 | | 3/2001 | Iwasa et al. |
| 7,515,360 | B2 | | 4/2009 | Miyazawa et al. |
| 7,839,583 | B2 | | 11/2010 | Kaneko et al. |
| 8,023,200 | B2 | | 9/2011 | Kuwahara et al. |
| 8,068,287 | B2 | | 11/2011 | Sato |
| 2001/0026401 | A1 | * | 10/2001 | Koiwai et al. ................. 359/699 |
| 2002/0005993 | A1 | * | 1/2002 | Koiwai .......................... 359/700 |
| 2006/0056079 | A1 | * | 3/2006 | Ishizuka et al. ............... 359/811 |
| 2007/0115566 | A1 | | 5/2007 | Miyazawa et al. |
| 2008/0190241 | A1 | * | 8/2008 | Kuwahara et al. .............. 74/838 |
| 2009/0052069 | A1 | | 2/2009 | Kaneko et al. |
| 2010/0020413 | A1 | | 1/2010 | Sato |

FOREIGN PATENT DOCUMENTS

| CN | 1971327 A | 5/2007 |
| CN | 101241219 A | 8/2008 |
| CN | 101373249 A | 2/2009 |
| CN | 101614859 A | 12/2009 |
| JP | U-H07-10711 | 2/1995 |
| JP | 09-203843 | 8/1997 |
| JP | 2001-100081 A | 4/2001 |

(Continued)

OTHER PUBLICATIONS

Office Action for the-corresponding Chinese Patent Application No. 201010233730.8, dated Nov. 26, 2013.

*Primary Examiner* — Thomas K Pham
*Assistant Examiner* — Vipin Patel
(74) *Attorney, Agent, or Firm* — Shinjyu Global IP

(57) ABSTRACT

A lens barrel includes a first support frame and a second support frame. The first support frame has a cam groove. The second support frame has an annular main body with a cam follower that extends outwardly in a radial direction. The cam follower is slidably disposed in the cam groove and has a first cam portion, a second cam portion and a connecting portion. The second cam portion is aligned with the first cam portion along the circumferential direction of the main body. The connecting portion connects the first cam portion and the second cam portion to create a space between the connecting portion and the cam groove.

25 Claims, 11 Drawing Sheets

(56) References Cited

FOREIGN PATENT DOCUMENTS

| JP | 2001-280447 | | 10/2001 |
| JP | 2003-315660 | A | 6/2003 |
| JP | 2005-115169 | | 4/2005 |
| JP | 2006-023781 | | 1/2006 |
| JP | 2007-298703 | | 11/2007 |
| WO | WO 2009/093474 | A1 | 7/2009 |
| WO | WO 2009/093475 | A1 | 7/2009 |

* cited by examiner

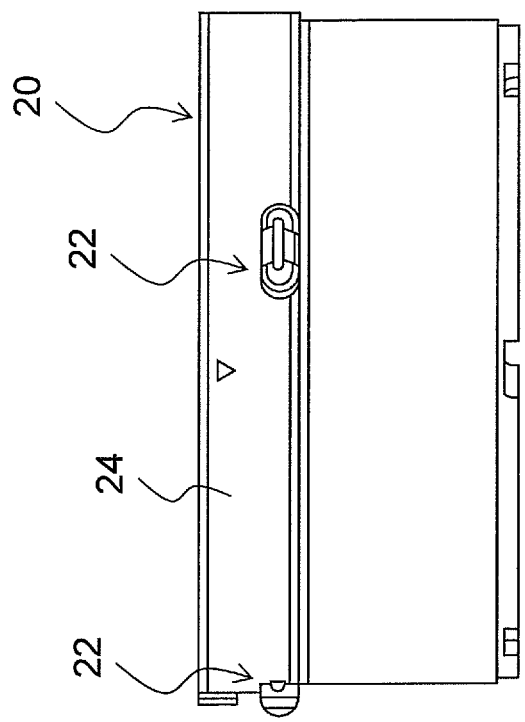
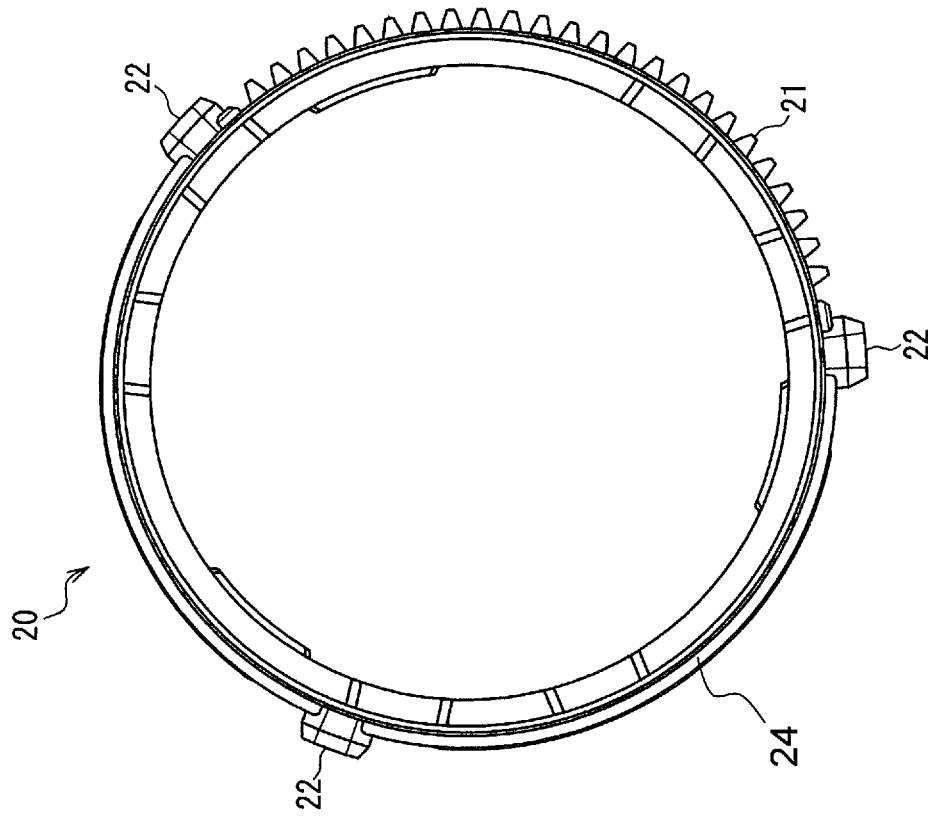
FIG. 4B
FIG. 4A

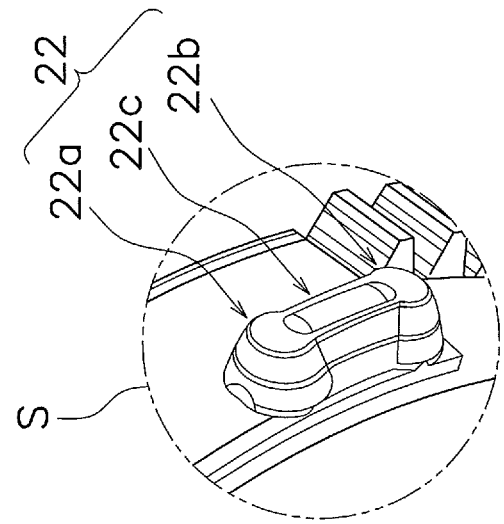
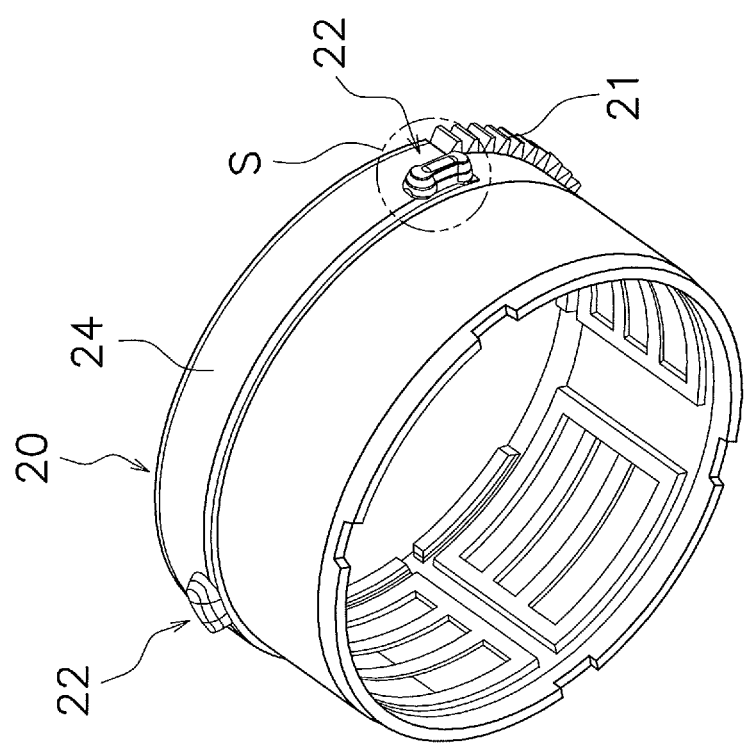
FIG. 5B
FIG. 5A

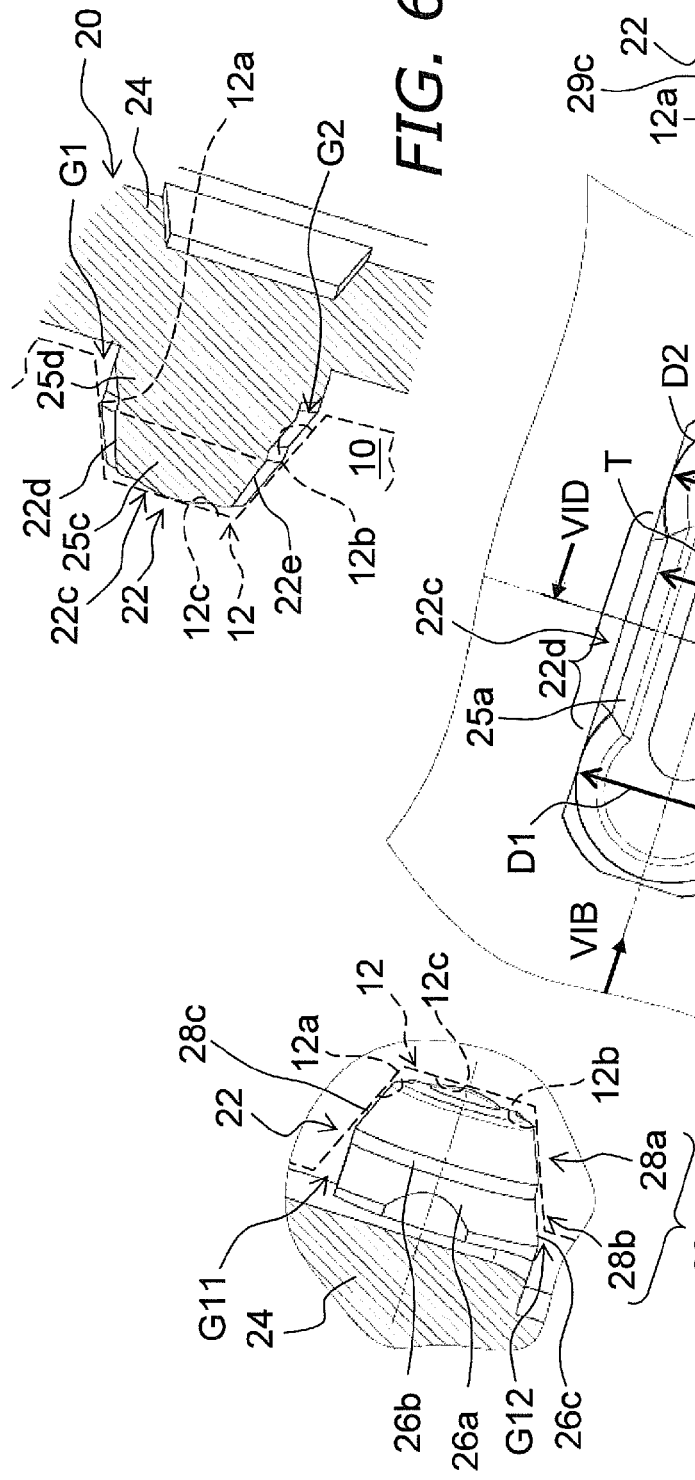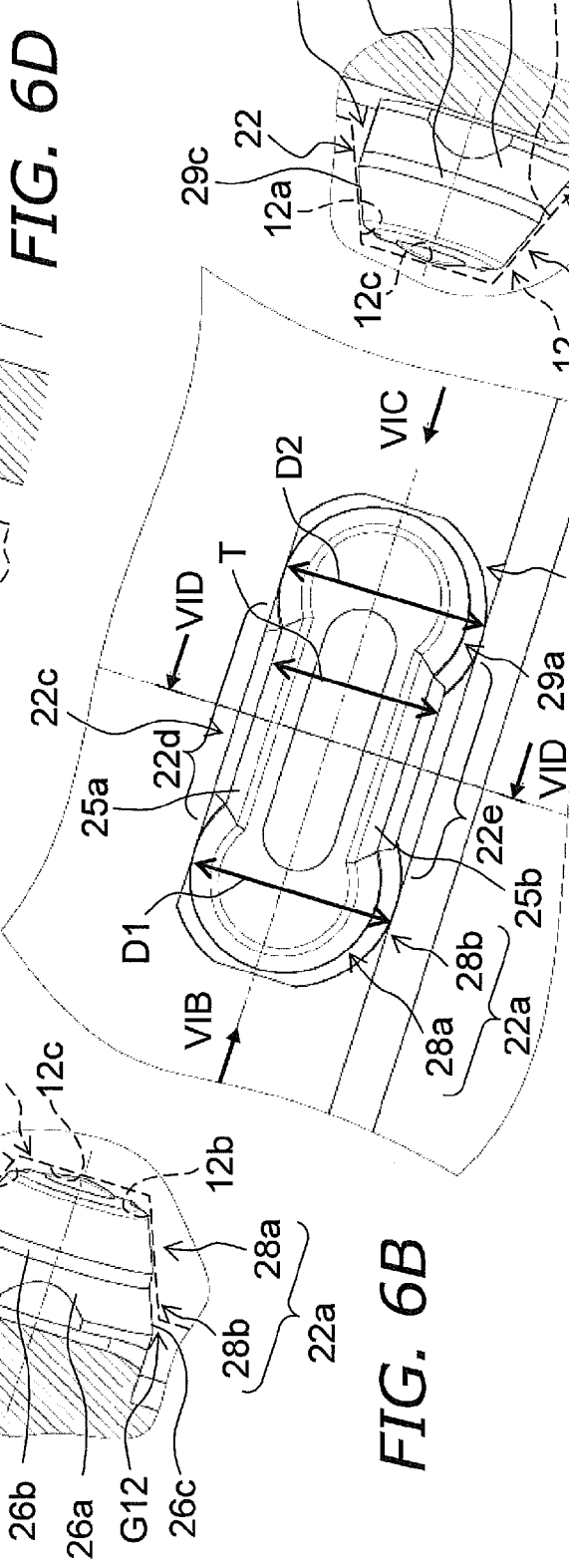

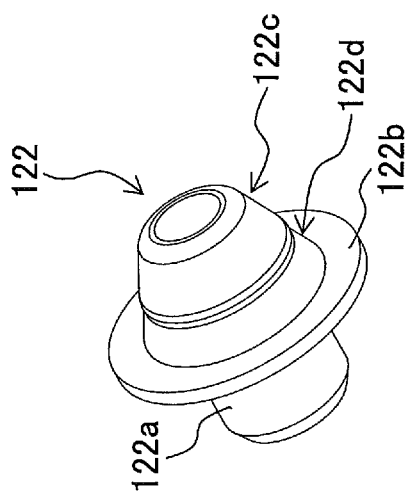
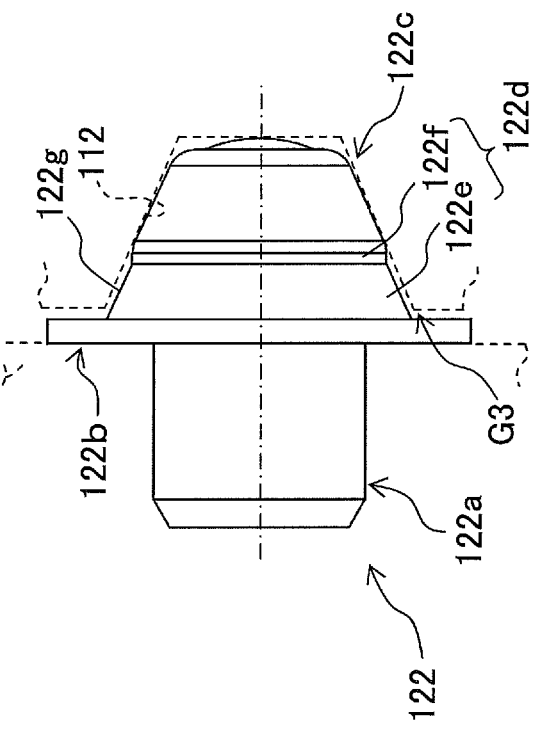

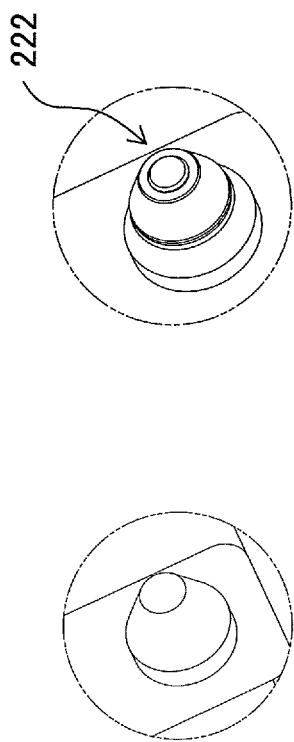
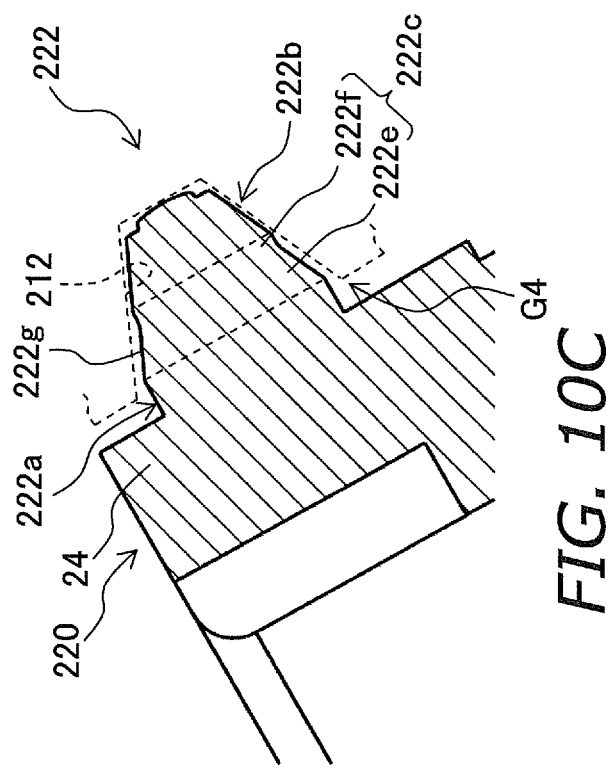
FIG. 10A
FIG. 10B
FIG. 10C

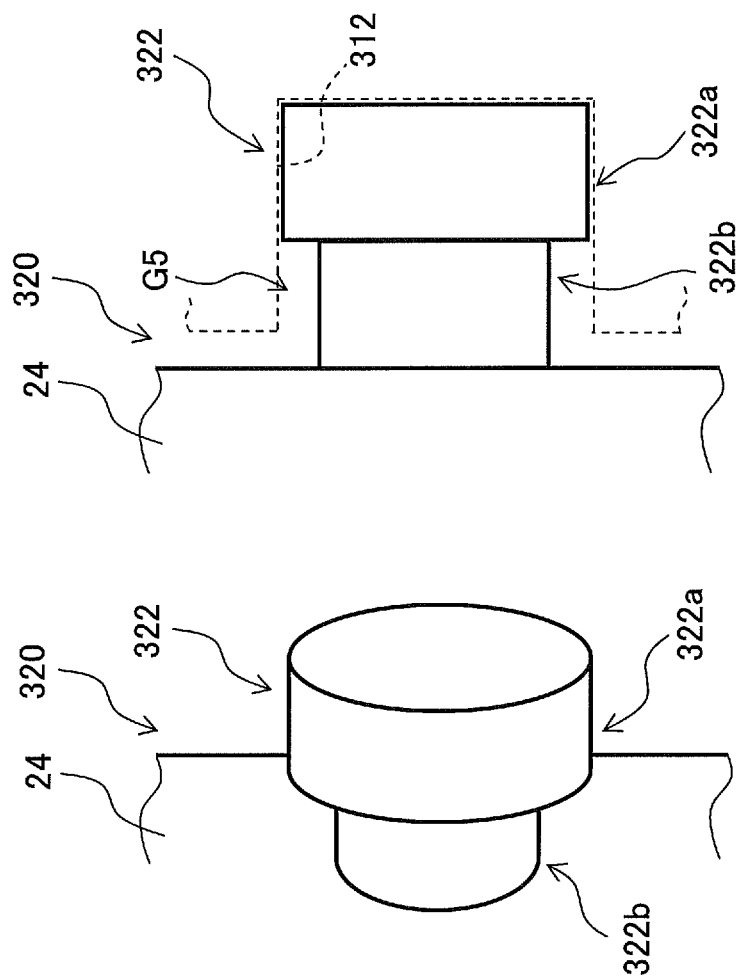

LENS BARREL AND IMAGING DEVICE

CROSS-REFERENCE TO RELATED APPLICATIONS

This application claims priority under 35 U.S.C.§119 to Japanese Patent Application No. 2009-174057 filed on Jul. 27, 2009, and Japanese Patent Application No. 2009-174058 filed on Jul. 27, 2009. The entire disclosures of Japanese Patent Applications No. 2009-174057 and No. 2009-174058 are hereby incorporated herein by reference.

BACKGROUND

1. Technical Field

The technology disclosed herein relates to a lens barrel that can be mounted to an imaging device such as a digital still camera, a digital video camera, or a portable telephone with a camera function.

2. Background Information

An imaging device such as a digital still camera comprises, for example, a camera body and a lens barrel supported by the camera body. One known type of lens barrel is called a telescoping lens barrel. A telescoping lens barrel houses an optical system that includes a zoom lens that can be deployed in the optical axis direction with respect to the camera body.

SUMMARY

One aspect of the technology disclosed herein is a lens barrel that comprises a first support frame and a second support frame. The first support frame has a cam groove. The second support frame has an annular main body with a cam follower that extends outwardly in a radial direction. The cam follower is slidably disposed in the cam groove and has a first cam portion, a second cam portion and a connecting portion. The second cam portion is aligned with the first cam portion along the circumferential direction of the main body. The connecting portion connects the first cam portion and the second cam portion to create a space between the connecting portion and the cam groove.

BRIEF DESCRIPTION OF DRAWINGS

Referring now to the attached drawings which form a part of this original disclosure:

FIG. 4A is a plan view of a drive frame (viewed in the direction indicated by the arrow B in FIG. 3), and FIG. 4B is a side view of the drive frame;

FIG. 5A is an oblique view of the drive frame, and FIG. 5B is a detail view of a cam follower (a detail view of the S portion in FIG. 5A);

FIG. 6A is a top view of a cam follower, FIG. 6B is a view along the VIB arrow of the cam follower, FIG. 6C is a view along the VIC arrow of the cam follower, and FIG. 6D is a VID-VID cross section of the cam follower;

FIG. 9A shows the cam follower in a comparative example, FIG. 9B is an oblique view of a cam follower (second embodiment), and FIG. 9C is a side view of a cam follower (fourth embodiment);

FIG. 10A shows the cam follower in a comparative example, FIG. 10B is an oblique view of a cam follower (third embodiment), and FIG. 10C is a cross section of a cam follower (fourth embodiment); and FIG. 11A is an oblique view of a cam follower (fourth embodiment), and FIG. 11B is a side view of a cam follower (fourth embodiment).

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

1: Configuration of Digital Camera

Figure 1:
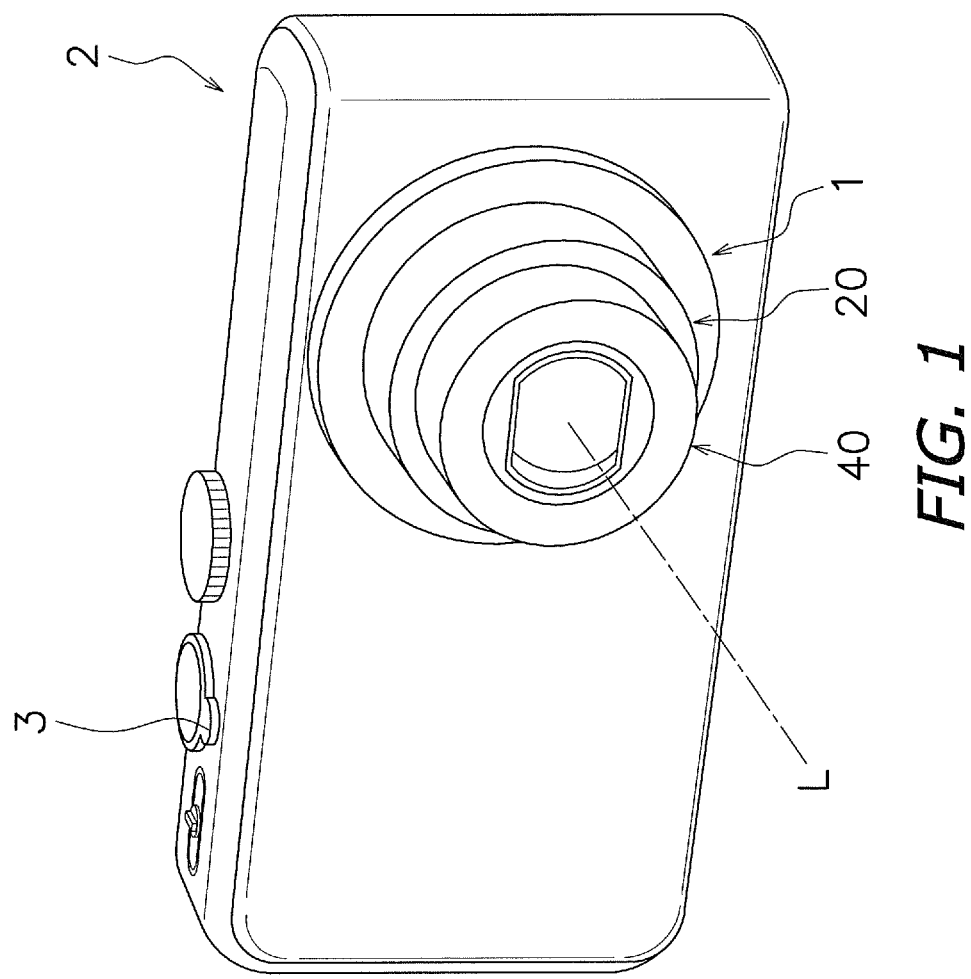
FIG. 1 is an oblique view of a digital camera.

As shown in FIG. 1, a lens barrel 1 is mounted on a digital camera 2 (an example of an imaging device). In the interior of the lens barrel 1 there are various lenses such as a zoom lens and a focus lens, an imaging element for converting incident light into an electrical signal and outputting this signal, and so forth. The digital camera 2 is a digital still camera, and is an example of an imaging device. Other examples of an imaging device besides a digital still camera include a digital video camera, a portable telephone with a camera function, and other such optical devices.

Figure 2:
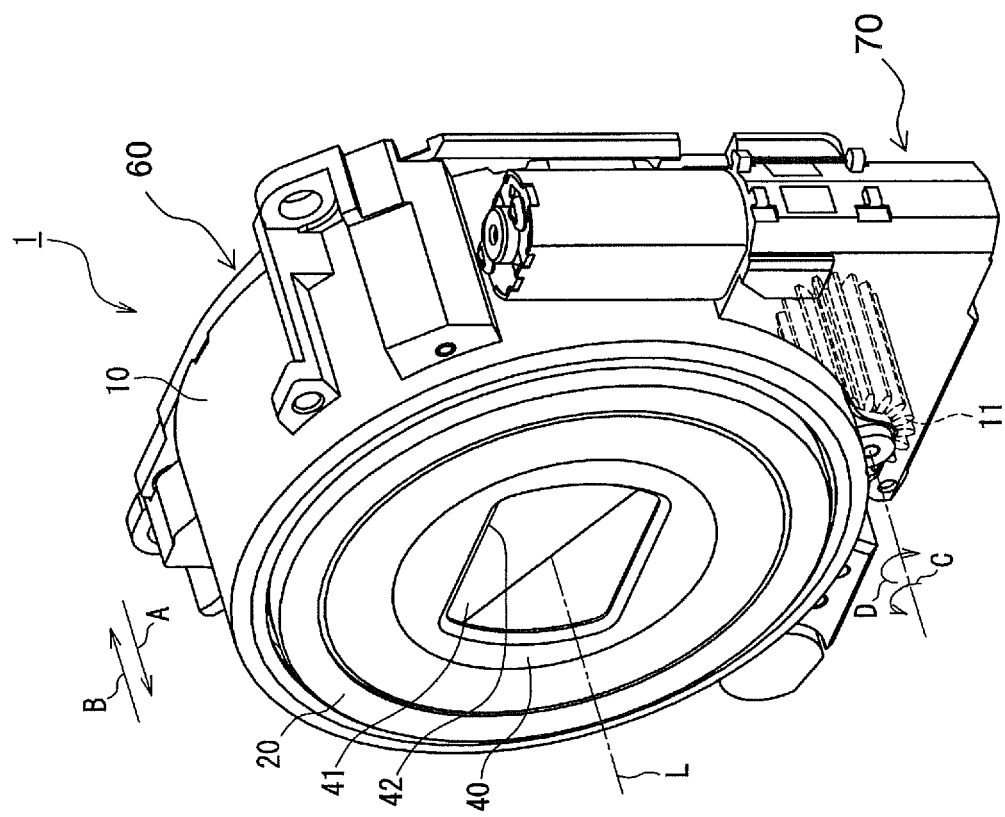
FIG. 2 is an oblique view of a lens barrel.
Figure 3:
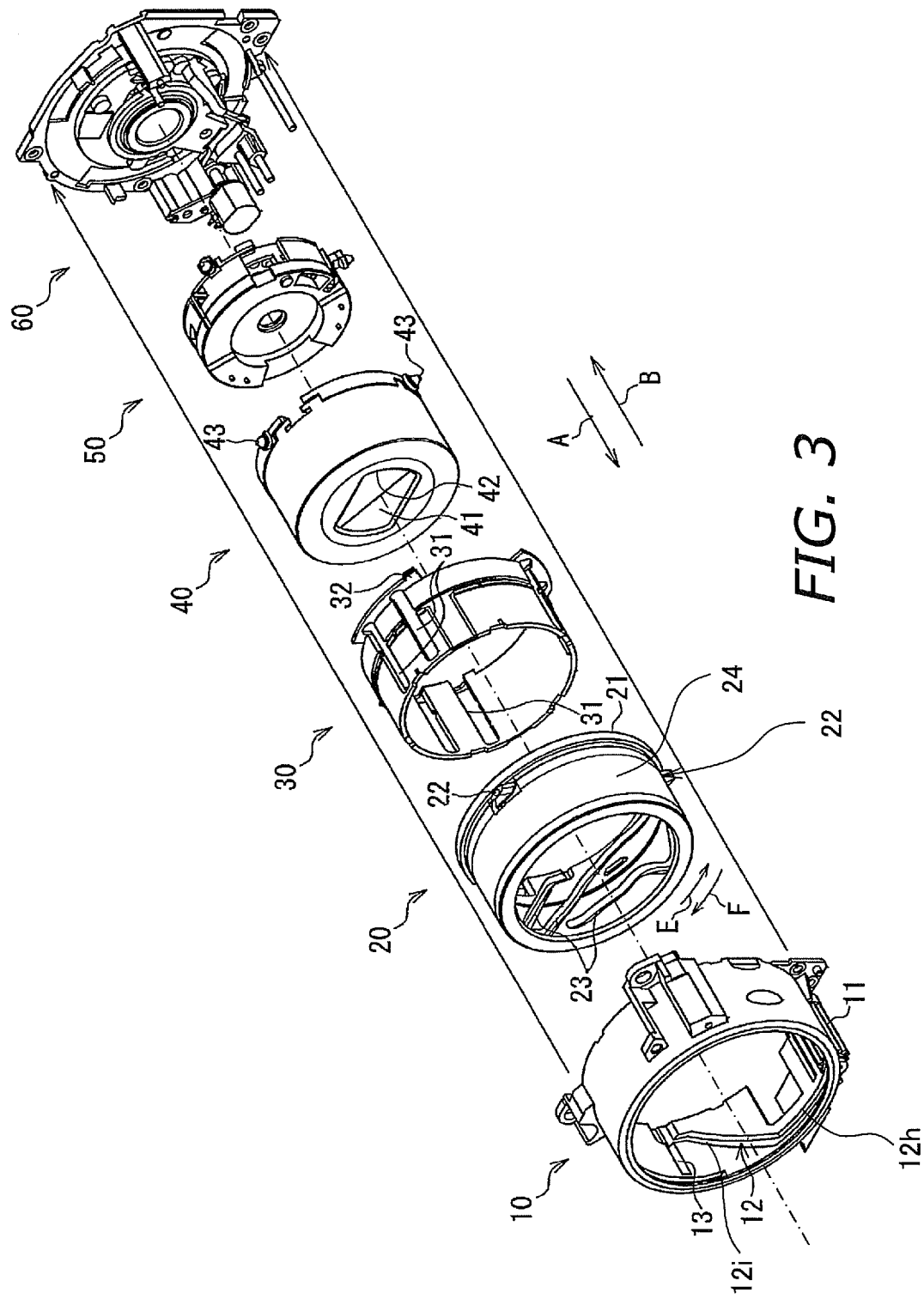
FIG. 3 is an exploded oblique view of a lens barrel.

As shown in FIGS. 2 and 3, the lens barrel 1 has an optical system (not shown), an imaging element (not shown), a motor unit 70, a fixing frame 10 (an example of a first support frame), a drive frame 20 (an example of a second support frame), a rectilinear frame 30 (see FIG. 3), a first lens group unit 40, a second lens group unit 50 (see FIG. 3), and a base 60. The optical system has various lenses such as a zoom lens and a focus lens. This optical system has an optical axis L defined by these lenses. In the description that follows, the direction parallel to the optical axis L is called the optical axis direction.

As shown in FIGS. 2 and 3, the fixing frame 10, the drive frame 20, the rectilinear frame 30, the first lens group unit 40, and the second lens group unit 50 are disposed coaxially with one another. A gear 11 of the motor unit 70 is disposed near the fixing frame 10. The gear 11 is rotationally driven by the motor of the motor unit 70, for example. The drive frame 20 and the first lens group unit 40 move in the direction indicated by the arrow B when the gear 11 is rotated in the direction indicated by the arrow C. The drive frame 20 and the first lens group unit 40 move in the direction indicated by the arrow A when the gear 11 is rotated in the direction indicated by the arrow D. The state of the lens barrel 1 shown in FIG. 2 is a state in which the drive frame 20 and the first lens group unit 40 are housed inside the fixing frame 10 (hereinafter referred to as the retracted state). The drive frame 20 and the first lens group unit 40 can be deployed from the fixing frame 10 in the direction indicated by the arrow A by rotating the gear 11. A flat lens barrier 41 is disposed in the first lens group unit 40. The lens barrier 41 opens and closes an opening 42 of the first lens group unit 40.

As shown in FIG. 3, the fixing frame 10 has three cam grooves 12 and three rectilinear grooves 13. The cam grooves 12 and the rectilinear grooves 13 are formed in the inner peripheral face of the fixing frame 10. The cam grooves 12 each have an inclined part 12i and a horizontal part 12h. The inclined part 12i is inclined with respect to the optical axis direction, and is used to deploy the drive frame 20. The horizontal part 12h is parallel to the circumferential direction, and is used during imaging. The rectilinear grooves 13 are disposed substantially parallel to the optical axis direction. The fixing frame 10 is fixed to the chassis (not shown) of the digital camera 2 along with the base 60. The fixing frame 10 preferably comprises a plurality of cam grooves 12.

As shown in FIGS. 2 and 3, the drive frame 20 is disposed inside the fixing frame 10, and is disposed to be rotatable in the circumferential direction with respect to the fixing frame 10, and move in the optical axis direction. More specifically, as shown in FIGS. 4A and 4B, the drive frame 20 has an annular drive frame main body 24 (an example of a main body), three cam followers 22 (an example of a cam follower), three guide grooves 23, and a rack 21.

As shown in FIGS. 4A, 4B, 5A and 5B, the three cam followers 22 protrude from the drive frame main body 24 outward in the radial direction (hereinafter, "radial direction" means the radial direction of the drive frame main body 24). The cam followers 22 are inserted into the three cam grooves 12, respectively. When the cam followers 22 move through the cam grooves 12, the drive frame 20 rotates with respect to the fixing frame 10 while moving in the optical axis direction, or the drive frame 20 rotates without moving in the optical axis direction with respect to the fixing frame 10. The drive frame 20 is disposed to be movable between a stowed position and an imaging position. The stowed position corresponds to the retracted state shown in FIG. 2, and the imaging position corresponds to the state during imaging. In the stowed position, the drive frame 20 is stowed inside the fixing frame 10. In the imaging position, part of the drive frame 20 protrudes in the optical axis direction from the fixing frame 10 (see FIG. 1, for example).

As shown in FIG. 3, the three guide grooves 23 are formed in the inner peripheral face of the drive frame main body 24. As shown in FIGS. 4A and 4B, the rack 21 is disposed on the outer peripheral face of the drive frame main body 24. In a state in which the drive frame 20 is assembled to the fixing frame 10, the rack 21 meshes with the gear 11. Consequently, the drive frame 20 can be rotated in the direction indicated by the arrow E or F (see FIG. 3) by rotating the gear 11 in the direction indicated by the arrow C or D.

The rectilinear frame 30 is disposed inside the drive frame 20, and is disposed to be movable integrally with the drive frame 20 in the optical axis direction, and rotate with respect to the drive frame 20. When the drive frame 20 moves in the direction indicated by the arrow A or B (see FIG. 2), the rectilinear frame 30 moves integrally with the drive frame 20. As shown in FIG. 3, the rectilinear frame 30 has a plurality of slots 31 and a plurality of rectilinear protrusions 32. The slots 31 are disposed substantially parallel to the optical axis direction, go from the outer peripheral face to the inner peripheral face of the rectilinear frame 30. The rectilinear protrusions 32 are formed on the outer peripheral face of the rectilinear frame 30, and are movably inserted in the rectilinear grooves 13 of the fixing frame 10. Since the rectilinear protrusions 32 are inserted into the rectilinear grooves 13, the rectilinear frame 30 moves in the optical axis direction without rotating with respect to the fixing frame 10.

The first lens group unit 40 is disposed inside the rectilinear frame 30, and supports an objective lens or other such first lens group (not shown) included in the optical system. The first lens group unit 40 has the lens barrier 41 and three cam pins 43. The lens barrier 41 is disposed to be able to open up and close off the opening 42. The cam pins 43 are disposed on the outer peripheral face, and are inserted through the slots 31 to be movable in the guide grooves 23. Therefore, when the drive frame 20 rotates in the direction indicated by the arrow E or F, the first lens group unit 40 moves in the optical axis direction without rotating with respect to the fixing frame 10.

The second lens group unit 50 supports a shutter unit or second lens group (not shown), or the like. The base 60 is fixed to the chassis (not shown) of the digital camera 2. A focus lens, imaging element, or the like is provided to the base 60.

The direction indicated by the arrow A and the direction indicated by the arrow B are substantially parallel to the optical axis L of the lens barrel 1. The direction indicated by the arrow E and the direction indicated by the arrow F are circumferential directions whose center is the optical axis L of the lens barrel 1.

2: Operation of Lens Barrel

The operation of the lens barrel 1 will now be described.

The retracted state shown in FIG. 2 is a state in which the power supply to the digital still camera equipped with the lens barrel 1 is off. In the retracted state shown in FIG. 2, the lens barrel 1 is such that the drive frame 20, the rectilinear frame 30, the first lens group unit 40, and the second lens group unit 50 are stowed in the fixing frame 10. The lens barrier 41 is closed.

When the power is switched on to the digital still camera in this state, the motor of the motor unit 70 is activated and begins its drive. As shown in FIG. 2, when the motor begins its drive, the gear 11 that is meshed directly or indirectly with the output shaft of the motor rotates in the direction indicated by the arrow C. Since the gear 11 is meshed with the rack 21, when the gear 11 rotates in the direction indicated by the arrow C, the drive frame 20 rotates in the direction indicated by the arrow E (see FIG. 3). When the drive frame 20 rotates, the cam followers 22 move through the cam grooves 12 (more precisely, through the inside of the inclined parts 12i (discussed below) of the cam grooves 12) while sliding with the cam grooves 12. As a result, the drive frame 20 moves in the direction indicated by the arrow A with respect to the fixing frame 10. Specifically, the drive frame 20 moves from the retracted state shown in FIG. 2 in the direction indicated by the arrow A with respect to the fixing frame 10, while rotating in the direction indicated by the arrow E with respect to the fixing frame 10. When the rotation of the drive frame 20 proceeds further, the cam followers 22 move through the horizontal parts 12h (discussed below) while sliding with the cam grooves 12. At this point the drive frame 20 rotates without moving in the optical axis direction with respect to the fixing frame 10.

Since the rectilinear frame 30 is disposed to be movable integrally with the drive frame 20 in the optical axis direction, when the drive frame 20 moves in the direction indicated by the arrow A with respect to the fixing frame 10, the rectilinear frame 30 moves along with the drive frame 20 in the direction indicated by the arrow A with respect to the fixing frame 10. Since the rectilinear protrusions 32 are inserted in the rectilinear grooves 13, the drive frame 20 moves in the direction indicated by the arrow A while rotating with respect to the fixing frame 10, but the rectilinear frame 30 moves in the direction indicated by the arrow A without rotating with respect to the fixing frame 10.

Furthermore, since the rotation of the first lens group unit 40 with respect to the fixing frame 10 is limited by the rectilinear frame 30, when the drive frame 20 rotates in the direction indicated by the arrow E, the cam pins 43 of the first lens group unit 40 move through the guide grooves 23. As a result, the first lens group unit 40 moves in the direction indicated by the arrow A with respect to the drive frame 20 according to the shape of the guide grooves 23.

The result of the above operation is that the drive frame 20, the rectilinear frame 30 and the first lens group unit 40 can be moved to a position protruding in the direction indicated by the arrow A with respect to the fixing frame 10. A state in which the drive frame 20 and the first lens group unit 40 have been deployed from the fixing frame 10 is an imaging standby state. In the imaging standby state, if the user operates a zoom switch 3 (see FIG. 1) provided to the digital still camera, the drive frame 20 is rotationally driven by the motor of the motor unit 70. Zooming is carried out in this way.

3: Configuration of Cam Followers

As discussed above, the cam followers 22 move through the cam grooves 12 of the fixing frame 10 while sliding with the cam grooves 12. At this point sliding resistance is generated between the cam followers 22 and the cam grooves 12, but since the cam followers 22 do not have an ordinary shape, the sliding resistance can be reduced with this lens barrel 1. The shape of the cam followers 22 will now be described in detail.

As shown in FIGS. 5A, 5B and 6A, the cam followers 22 are formed integrally with the drive frame main body 24, and overall extend in a slender shape in the circumferential direction. The cam followers 22 each have a first cam portion 22a that is substantially circular, a second cam portion 22b that is substantially circular, and a connecting portion 22c. The second cam portions 22b are disposed aligned with the first cam portions 22a in a direction along the outer peripheral face of the drive frame main body 24. In this embodiment, the second cam portions 22b are disposed aligned with the first cam portions 22a in the circumferential direction of the drive frame main body 24.

3.1: First Cam Portions

The first cam portions 22a are inserted into the cam grooves 12, and are disposed slidably with the cam grooves 12. More specifically, as shown in FIG. 6B, the first cam portions 22a each have a first contact portion 28a (an example of a first contact portion, and an example of a sliding portion) and a first root portion 28b (an example of a first root portion, and an example of a stepped portion). When viewed in the radial direction of the drive frame main body 24, the first cam portions 22a are substantially circular. The shape of the first cam portions 22a, however, may be some other shape besides circular.

The first contact portions 28a are disposed slidably with the cam grooves 12. The first contact portions 28a protrude outward in the radial direction from the first root portions 28b, and are in contact with the cam grooves 12. The first contact portions 28a have tapered first sliding surfaces 28c. The first sliding surfaces 28c are in contact with the cam grooves 12.

The first root portions 28b are disposed between the first contact portions 28a and the drive frame main body 24, and gaps are formed between the first root portions 28b and the cam grooves 12. That is, the first root portions 28b are not in contact with the cam grooves 12. When the cam followers 22 are disposed in the horizontal parts 12h of the cam grooves 12, for example, the first root portions 28b are disposed with first gaps G11 and G12 between them and the cam grooves 12.

The first root portions 28b each have a first base portion 26a (an example of a first base portion, an example of a base portion) that protrudes outward in the radial direction from the drive frame main body 24, and a first intermediate portion 26b (an example of a first intermediate portion, an example of an intermediate portion) that connects the first contact portion 28a and the first base portion 26a. The first root portions 28b are formed so that they gradually move away from the cam grooves 12 as they approach the drive frame main body 24. More specifically, the first base portions 26a have first inclined surfaces 26c (an example of a first inclined surface, an example of an inclined surface) that are inclined with respect to the radial direction. Since the first inclined surfaces 26c are inclined with respect to the radial direction, the size of the first base portions 26a changes in the radial direction of the drive frame 20. More precisely, the diameter of the first base portions 26a (an example of the external dimension of the first base portions, an example of the external dimension of the base portions) gradually becomes smaller moving outward in the radial direction. In other words, the diameter of the first base portion 26a gradually becomes greater approaching the drive frame main body 24. In this embodiment, the first base portions 26a are not completely tapered, and include a surface that is not inclined with respect to the radial direction in addition to the first inclined surfaces 26c. The inclination angle of the first inclined surfaces 26c with respect to the radial direction is the same as the inclination angle of the first guide faces 12a with respect to the radial direction, and is the same as the inclination angle of the second guide faces 12b with respect to the radial direction.

In contrast, the diameter of the first intermediate portions 26b (an example of the external dimension of the first intermediate portion, an example of the external dimension of the intermediate portion) does not change in the radial direction of the drive frame 20, and substantially is constant in the radial direction of the drive frame 20. Therefore, the first base portions 26a and the first intermediate portions 26b form a constricted step between the first contact portions 28a and the drive frame main body 24.

3.2: Second Cam Portions

The second cam portions 22b are inserted into the cam grooves 12 and are disposed slidably with the cam grooves 12. More specifically, as shown in FIG. 6C, the second cam portions 22b have second contact portions 29a (an example of a second contact portion, and an example of a sliding portion) and second root portions 29b (an example of a second root portion, and an example of a stepped portion). When viewed in the radial direction of the drive frame main body 24, the second cam portions 22b are substantially circular. The shape of the second cam portions 22b, however, may be some other shape besides circular.

The second contact portions 29a are disposed slidably with the cam grooves 12. The second contact portions 29a protrude outward in the radial direction from the second root portions 29b, and are in contact with the cam grooves 12. The second contact portions 29a have tapered second sliding surfaces 29c. The second sliding surfaces 29c are in contact with the cam grooves 12.

The second root portions 29b are disposed between the second contact portions 29a and the drive frame main body 24, and gaps are formed between the second root portions 29b and the cam grooves 12. That is, just as with the first root portions 28b, the second root portions 29b are not in contact with the cam grooves 12. When the cam followers 22 are disposed in the horizontal parts 12h of the cam grooves 12, for example, first gaps G21 and G22 are formed between the second root portions 29b and the cam grooves 12.

The second root portions 29b each have a second base portion 27a (an example of a second base portion, an example of a base portion) that protrudes outward in the radial direction from the drive frame main body 24, and a second intermediate portion 27b (an example of a second intermediate portion, an example of an intermediate portion) that connects the second base portion 27a and the second contact portion 29a. The second root portions 29b are formed so that they gradually move away from the cam grooves 12 as they approach the drive frame main body 24. More specifically, the second base portions 27a have second inclined surfaces 27c (an example of a second inclined surface, an example of an inclined surface) that are inclined with respect to the radial direction. Since the second inclined surfaces 27c are inclined with respect to the radial direction, the size of the second base portions 27a changes in the radial direction of the drive frame 20. More precisely, the diameter of the second base portions 27a (an example of the external dimension of the second base portions, an example of the external dimension of the base portions) gradually becomes smaller moving outward in the radial direction. In other words, the diameter of the second base portion 27a gradually becomes greater approaching the drive frame main body 24. In this embodiment, the second base portions 27a are not completely tapered, and include a surface that is not inclined with respect to the radial direction in addition to the second inclined surfaces 27c. The inclination angle of the second inclined surfaces 27c is the same as the inclination angle of first guide faces 12a with respect to the radial direction, and is the same as the inclination angle of the second guide faces 12b with respect to the radial direction.

In contrast, the diameter of the second intermediate portions 27b (an example of the external dimension of the second intermediate portion, an example of the external dimension of the intermediate portion) does not change in the radial direction of the drive frame 20, and substantially is constant in the radial direction of the drive frame 20. Therefore, the second base portions 27a and the second intermediate portions 27b form a constricted step between the second contact portions 29a and the drive frame main body 24.

3.3: Connecting Portions

As shown in FIG. 6D, the connecting portions 22c are inserted into the cam grooves 12, and protrude outward in the radial direction from the drive frame main body 24. As shown in FIGS. 6A and 8A, the connecting portions 22c extend in the circumferential direction from the first cam portions 22a to the second cam portions 22b, and connect the first cam portions 22a and the second cam portions 22b in the circumferential direction. More precisely, the connecting portions 22c connect the first contact portions 28a and the second contact portions 29a, and also connect the first root portions 28b and the second root portions 29b. It will be apparent to those skilled in the lens barrel art from this disclosure that various connections can be used to join the connecting portions 22c with the first contact portion 28a and the second contact portion 29a. For example, FIGS. 6A, 7 and 8A shows the connecting portions 22c formed integrally as a one-piece, unitary member with the first contact portions 28a and the second contact portions 29a.

3.4: Relation Between Cam Followers and Cam Grooves

The relation between the cam followers 22 and the cam grooves 12 will now be described in greater detail. As shown in FIGS. 6B, 6C and 7, each of the cam grooves 12 has a first guide face 12a, a second guide face 12b, and a bottom face 12c. The first guide faces 12a and the second guide faces 12b are inclined with respect to the radial direction. The first guide faces 12a are disposed slidably with the first cam portions 22a and the second cam portions 22b, and the second guide faces 12b are disposed slidably with the first cam portions 22a and the second cam portions 22b. The inclination angle of the first sliding surfaces 28c of the second contact portions 29a is substantially the same as the inclination angle of the first guide faces 12a and the second guide faces 12b, and the inclination angle of the second sliding surfaces 29c of the second contact portions 29a is substantially the same as the inclination angle of the first guide faces 12a and the second guide faces 12b. The radial direction of the drive frame 20 is use as a reference for the inclination angle here.

Figure 7:
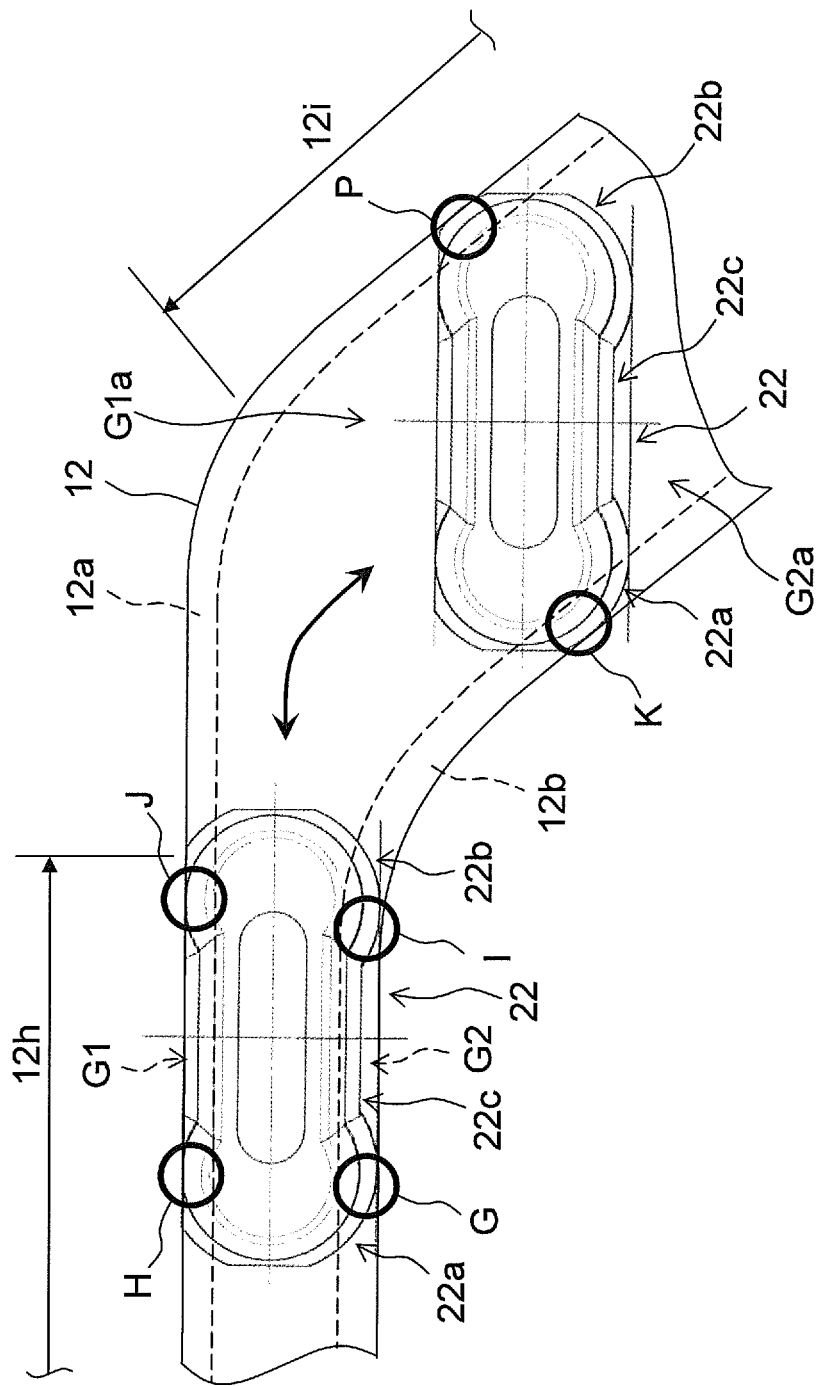
FIG. 7 shows the relation between the cam groove and the cam follower.
Figure 8B:
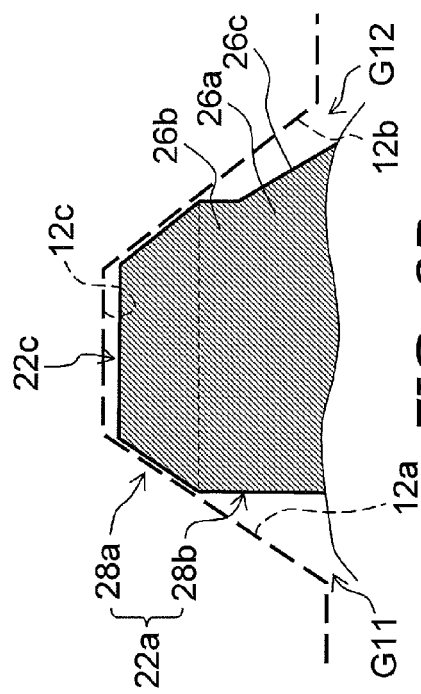
FIG. 8B is a cross sectional view of the cam follower in FIG. 8A along line VIIIB-VIIIB.
Figure 8C:
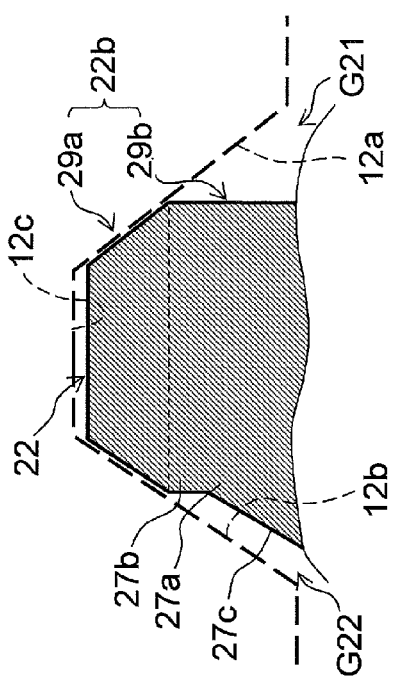
FIG. 8C is a cross sectional view of the cam follower in FIG. 8A along line VIIIC-VIIIC.
Figure 8A:
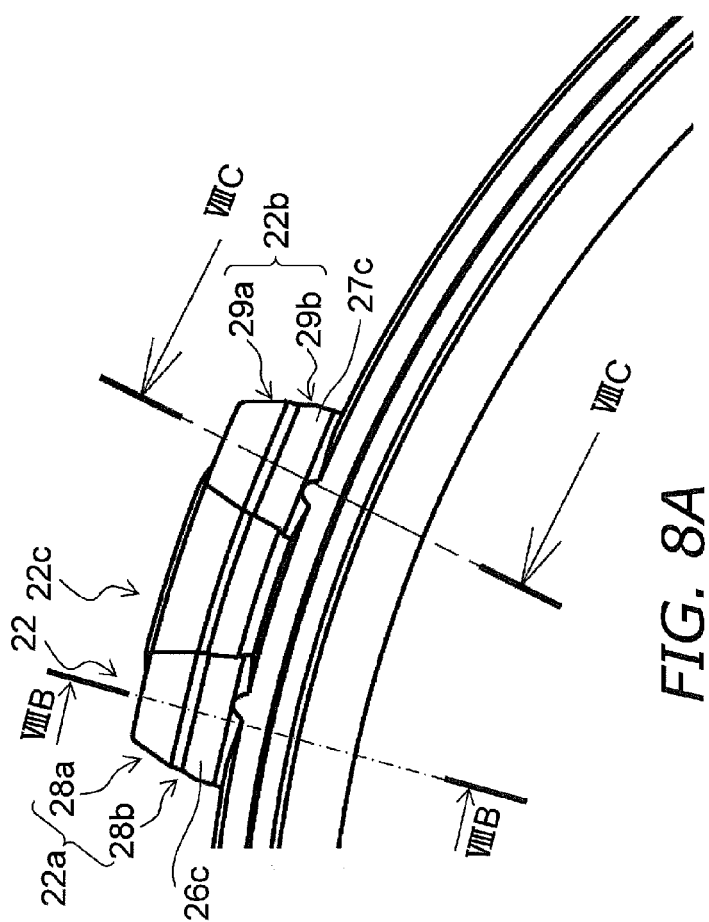
FIG. 8A is a side view of the cam follower.

Meanwhile, as shown in FIGS. 6D and 7, a space is formed between the connecting portions 22c and the cam grooves 12. More specifically, when the cam followers 22 are disposed in the horizontal parts 12h of the cam grooves 12, first spaces G1 (an example of a first space) are formed between the connecting portions 22c and the first guide faces 12a, and second spaces G2 (an example of a second space) are formed between the connecting portions 22c and the second guide faces 12b. Also, when the cam followers 22 are disposed in the inclined parts 12i of the cam grooves 12, first spaces G1a (an example of a first space) are formed between the connecting portions 22c and the first guide faces 12a, and second spaces G2a (an example of a second space) are formed between the connecting portions 22c and the second guide faces 12b. That is, the first cam portions 22a and the second cam portions 22b are in contact with the cam grooves 12, but the connecting portions 22c are not in contact with the cam grooves 12.

As shown in FIG. 6A, the width T of the connecting portions 22c (the size in the optical axis direction) is smaller than the diameter D1 of the first contact portions 28a and the diameter D2 of the second contact portions 29a. It can also be said that the first cam portions 22a, the second cam portions 22b, and the connecting portions 22c form first concave portions 22d and second concave portions 22e. When the cam followers 22 are disposed in the horizontal parts 12h of the cam grooves 12, as shown in FIG. 6D, the first spaces G1 are formed by the first concave portions 22d and the cam grooves 12, and the second spaces G2 are formed by the second concave portions 22e and the cam grooves 12.

Since the cam followers 22 have the constitution discussed above, as shown in FIG. 7, when the cam followers 22 are disposed in the horizontal parts 12h of the cam grooves 12, the first cam portions 22a are in contact with the cam grooves 12 near the circles G and H, and the second cam portions 22b are in contact with the cam grooves 12 near the circles I and J. That is, when the cam followers 22 are disposed in the horizontal parts 12h of the cam grooves 12, the cam followers 22 are in contact with the cam grooves 12 at four places, so the contact surface area between the cam followers 22 and the cam grooves 12 can be kept small compared to the size of the cam followers 22.

On the other hand, when the cam followers 22 are disposed in the inclined parts 12i of the cam grooves 12, the first cam portions 22a are in contact with the cam grooves 12 near the circle K, and the second cam portions 22b are in contact with the cam grooves 12 near the circle P. That is, when the cam followers 22 are disposed in the inclined parts 12i of the cam grooves 12, the cam followers 22 are in contact with the cam grooves 12 at just two places.

4: Features of Lens Barrel

As described above, with this lens barrel 1, since spaces (the first spaces G1 and the second spaces G2) are formed between the connecting portions 22c and the cam grooves 12, when the cam followers 22 move through the cam grooves 12, the first cam portions 22a and the second cam portions 22b slide with the cam grooves 12, but the connecting portions 22c do not slide with the cam grooves 12. Therefore, compared to when the entire cam followers 22 slide with the cam grooves 12, the contact surface area can be smaller and the sliding resistance of the cam followers 22 can be reduced.

Also, since the first cam portions 22a and the second cam portions 22b are connected by the connecting portions 22c, good overall strength can be ensured for the cam followers 22.

Therefore, with this lens barrel, good strength can be ensured while reducing the sliding resistance.

Also, since the first gaps G11 is formed between the first root portions 28b and the cam grooves 12, the first contact portions 28a slide with the cam grooves 12, but the first root portions 28b do not slide with the cam grooves 12. Furthermore, since the second gaps G12 is formed between the second root portions 29b and the cam grooves 12, the second contact portions 29a slide with the cam grooves 12, but the second root portions 29b do not slide with the cam grooves 12. Therefore, with this lens barrel 1, the contact surface area between the cam followers 22 and the cam grooves 12 can be made even smaller, and sliding resistance can be further reduced.

Furthermore, the dimensional precision of the cam followers 22 should be strictly managed for just the first contact portions 28a and the second contact portions 29a by limiting the range over which the cam followers 22 come into contact with the cam grooves 12 to the first contact portions 28a and the second contact portions 29a. Therefore, with the mold used to manufacture the drive frame 20, fewer places have to be machined to high dimensional precision, so the mold will take less time to machine or the machining cost can be cut. In other words, the cost to manufacture the lens barrel 1 can be reduced.

Second Embodiment

In the first embodiment the cam followers 22 had the first cam portions 22a, the second cam portions 22b, and the connecting portions 22c, but sliding resistance can also be reduced with a cam follower such as that shown in FIGS. 9A to 9C.

As shown in FIGS. 9B and 9C, a drive frame 120 includes the drive frame main body 24 mentioned in the first embodiment and cam followers 122. The cam followers 122 (an example of a cam member) are made of metal and embedded in the drive frame main body 24, for example. The cam followers 122 each have an embedded portion 122a, a seat 122b, a sliding portion 122c, and a stepped portion 122d. The embedded portion 122a is embedded in the drive frame main body 24. The sliding portion 122c and the stepped portion 122d are inserted into a cam groove 112 (an example of a cam guide groove). The sliding portion 122c is disposed slidably with the cam groove 112. A gap G3 is formed between the stepped portion 122d and the cam groove 112.

More specifically, the stepped portion 122d has a base portion 122e protruding from the drive frame main body 24 in the radial direction and an intermediate portion 122f connecting the base portion 122e and the sliding portion 122c in the radial direction. The base portion 122e includes an inclined surface 122g inclined with respect to the radial direction. The gap G3 is formed between the cam groove 112 and the inclined surface 122g. The diameter of the base portion 122e (an example of an external dimension of a base portion) gradually becomes greater approaching the drive frame main body 24. The diameter of the intermediate portion 122f (an example of an external dimension of an intermediate portion) is substantially constant in the radial direction.

As discussed above, unlike with the cam followers in the comparative example shown in FIG. 9A, the stepped portion 122d does not slide with the cam groove 112.

Sliding resistance can be reduced with this cam follower 122 as well.

Third Embodiment

Sliding resistance can also be reduced with the cam follower 222 shown in FIGS. 10B and 10C.

As shown in FIGS. 10B and 10C, a drive frame 220 includes the drive frame main body 24 mentioned in the first embodiment and cam followers 222. The cam follower 222 (an example of a cam member) has a seat portion 222a, a sliding portion 222b, and a stepped portion 222c. The cam follower 222 is formed integrally with the drive frame main body 24 made of resin. The cam follower 222 is inserted into a cam groove 212 (an example of a cam guide groove). The sliding portion 222b is disposed slidably with the cam groove 212. A gap G4 is formed between the stepped portion 222c and the cam groove 212.

More specifically, the stepped portion 222c has a base portion 222e protruding from the drive frame main body 24 in the radial direction and an intermediate portion 222f connecting the base portion 222e and the sliding portion 222b in the radial direction. The base portion 222e includes an inclined surface 222g inclined with respect to the radial direction. The gap G4 is formed between the cam groove 212 and the inclined surface 222g. The diameter of the base portion 222e (an example of an external dimension of a base portion) gradually becomes greater approaching the drive frame main body 24. The diameter of the intermediate portion 222f (an example of an external dimension of an intermediate portion) is substantially constant in the radial direction.

As discussed above, unlike with the cam followers in the comparative example shown in FIG. 10A, the stepped portion 222c does not slide with the cam groove 212.

Sliding resistance can be reduced with this cam follower 222 as well.

Fourth Embodiment

Sliding resistance can also be reduced with the cam follower 322 shown in FIGS. 11B and 11C.

As shown in FIGS. 11B and 11C, a drive frame 320 includes the drive frame main body 24 mentioned in the first embodiment and cam followers 322. Unlike the cam followers above, the cam follower 322 (an example of a cam member) does not have a tapered shape. More specifically, the cam follower 322 has a columnar sliding portion 322a and a columnar stepped portion 322b, and is inserted into a cam groove 312. The sliding portion 322a is disposed slidably with the cam groove 312 (an example of a cam guide groove). Since the diameter of the stepped portion 322b is smaller than the diameter of the sliding portion 322a, a gap G5 is formed between the stepped portion 322b and the cam groove 312. Therefore, the stepped portion 322b does not slide with the cam groove 312.

Sliding resistance can be reduced with this cam follower 322 as well.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional team refer to those directions of an imaging device equipped with the optical element driving. Accordingly, these terms, as utilized to describe the present invention should be interpreted relative to an imaging device equipped with the optical element driving.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

What is claimed is:

1. A lens barrel comprising:
   a first support frame having a cam groove, the cam groove having a first guide face and a second guide face; and
   a second support frame having an annular main body with a cam follower extending outwardly from the main body in a radial direction and slidably disposed in the cam groove, the cam follower having
      a first cam portion,
      a second cam portion, and
      a connecting portion configured to connect the first cam portion and the second cam portion; and
   wherein the first cam portion, the second cam portion, and the connecting portion are integrally formed as a one-piece, unitary member;
   the cam groove includes
      a first region and a second region,
      the first cam portion contacting the first guide face and the second guide face in the first region,
      the second cam portion contacting the first guide face and the second guide face in the first region,
      the first cam portion contacting the second guide face, but not the first guide face, in the second region, and
      the second cam portion contacting the first guide face, but not the second guide face, in the second region;
   the second support frame is configured to advance and retract relative to the first support frame by sliding the cam follower in the cam groove once the second support frame is rotated relative to the first support frame; and
   a first concave portion is formed between the connecting portion and the first guide face, and a second concave portion is formed between the connecting portion and the second guide face, if both the first cam portion and second cam portion contact both the first guide face and the second guide face.

2. The lens barrel according to claim 1, wherein
the first cam portion has a first contact portion that is in contact with the cam groove, and the second cam portion has a second contact portion that is in contact with the cam groove.

3. The lens barrel according to claim 2, wherein
the first cam portion has a first root portion disposed between the first contact portion and the main body, the first cam portion is positioned to create a first gap between the first root portion and the cam groove, the second cam portion has a second root portion disposed between the second contact portion and the main body, the second cam portion is positioned to create a second gap between the second root portion and the cam groove.

4. The lens barrel according to claim 3, wherein
the first root portion has a first base portion extending outwardly from the main body in the radial direction and a first intermediate portion connecting the first base portion and the first contact portion along the radial direction.

5. The lens barrel according to claim 4, wherein
the first base portion has a first inclined surface forming an angle with respect to the radial direction so that the first gap is formed between the cam groove and the first base portion.

6. The lens barrel according to claim 4, wherein
an external dimension of the first base portion gradually increases closer to the main body.

7. The lens barrel according to claim 4, wherein
an external dimension of the first intermediate portion is substantially constant in the radial direction.

8. The lens barrel according to claim 3, wherein
the second root portion has a second base portion extending outwardly from the main body in the radial direction, and a second intermediate portion connecting the second base portion and the second contact portion along the radial direction.

9. The lens barrel according to claim 8, wherein
the second base portion has a second inclined surface forming an angle with respect to the radial direction so that the second gap is formed between the cam groove and the second base portion.

10. The lens barrel according to claim 8, wherein
an external dimension of the second base portion gradually increases closer to the main body.

11. The lens barrel according to claim 8, wherein
an external dimension of the second intermediate portion is substantially constant in the radial direction.

12. The lens barrel according to claim 3, wherein
the connecting portion connects the first root portion and the second root portion.

13. The lens barrel according to claim 1, wherein
the first cam portion is substantially circular when viewed from the radial direction of the main body, and the second cam portion is substantially circular when viewed from the radial direction of the main body.

14. An imaging device equipped with the lens barrel according to claim 1.

15. A lens barrel comprising:
   a first support frame having a cam guide groove including a first guide face and a second guide face; and
   a second support frame having an annular main body with a cam member that extends outwardly from the main body in a radial direction, the cam member being slidably disposed in the cam guide groove and includes;
      a first cam portion,
      a second cam portion,
      a stepped portion disposed along the radial direction perpendicular to the main body or inclined at an angle relative to the main body, and
      a sliding portion configured to slidably contact the cam guide groove, the sliding portion being disposed outwardly from the stepped portion in the radial direction to create a gap between the stepped portion and the cam guide groove, and
      a connecting portion configured to connect the stepped portion and the sliding portion;

wherein the main body is integrally formed with the cam member as a one-piece, unitary member;
the cam groove includes
a first region and a second region,
the first cam portion contacting the first guide face and the second guide face in the first region,
the second cam portion contacting the first guide face and the second guide face in the first region,
the first cam portion contacting the second guide face, but not the first guide face, in the second region, and
the second cam portion contacting the first guide face, but not the second guide face, in the second region; and
a first concave portion is formed between the connecting portion and the first guide face, and a second concave portion is formed between the connecting portion and the second guide face, if both the first cam portion and second cam portion contact both the first guide face and the second guide face.

16. The lens barrel according to claim 15, wherein the stepped portion has a base portion that extends from the main body in the radial direction and an intermediate portion that connects the base portion and the sliding portion along the radial direction.

17. The lens barrel according to claim 16, wherein the base portion has an inclined surface forming an angle with respect to the radial direction so that the gap is formed between the cam guide groove and the base portion.

18. The lens barrel according to claim 16, wherein an external dimension of the base portion gradually increases closer to the main body.

19. The lens barrel according to claim 16, wherein an external dimension of the intermediate portion is substantially constant in the radial direction.

20. A lens barrel comprising:
a first support frame having a cam groove; and
a second support frame having an annular main body with a cam follower extending outwardly from the main body in a radial direction and slidably disposed in the cam groove, the cam follower having
  a first cam portion having a first contact portion and a first root portion, the first contact portion being in contact with the cam groove, the first root portion being disposed between the first contact portion and the main body, the first root portion having a first base portion with an inclined surface and a first intermediate portion, the first base portion extending outwardly from the main body in the radial direction, the first intermediate portion connecting the first base portion and the first contact portion along the radial direction,
  a second cam portion in alignment with the first cam portion along the circumferential direction of the main body, the second cam portion having a second contact portion and a second root portion, the second contact portion being in contact with the cam groove, and the second root portion being disposed between the second contact portion and the main body, the second cam portion being positioned to create a second gap between the second root portion and the cam groove, and
  a connecting portion disposed between and formed continuously with the first cam portion and the second cam portion to create a space between the connecting portion and the cam groove,
the first cam portion being positioned to create a first gap between the first root portion and the cam groove, and the first inclined surface being positioned at an angle relative to the radial direction so that the first gap is formed between the cam groove and the first base portion.

21. A lens barrel comprising:
a first support frame having a cam groove; and
a second support frame having an annular main body with a cam follower extending outwardly from the main body in a radial direction and slidably disposed in the cam groove, the cam follower having
  a first cam portion having a first contact portion and a first root portion, the first contact portion being in contact with the cam groove, the first root portion being disposed between the first contact portion and the main body, the first root portion having a first base portion and a first intermediate portion, the first base portion extending outwardly from the main body in the radial direction, the first intermediate portion connecting the first base portion and the first contact portion along the radial direction,
  a second cam portion in alignment with the first cam portion along the circumferential direction of the main body, the second cam portion having a second contact portion and a second root portion, the second contact portion being in contact with the cam groove, and the second root portion being disposed between the second contact portion and the main body, the second cam portion being positioned to create a second gap between the second root portion and the cam groove, and
  a connecting portion disposed between and formed continuously with the first cam portion and the second cam portion to create a space between the connecting portion and the cam groove,
the first cam portion being positioned to create a first gap between the first root portion and the cam groove, and
an external dimension of the first base portion gradually increases closer to the main body.

22. A lens barrel comprising:
a first support frame having a cam groove; and
a second support frame having an annular main body with a cam follower extending outwardly from the main body in a radial direction and slidably disposed in the cam groove, the cam follower having
  a first cam portion having a first contact portion and a first root portion, the first contact portion being in contact with the cam groove, the first root portion being disposed between the first contact portion and the main body, the first root portion having a first base portion and a first intermediate portion, the first base portion extending outwardly from the main body in the radial direction, the first intermediate portion connecting the first base portion and the first contact portion along the radial direction,
  a second cam portion in alignment with the first cam portion along the circumferential direction of the main body, the second cam portion having a second contact portion and a second root portion, the second contact portion being in contact with the cam groove, and the second root portion being disposed between the second contact portion and the main body, the second cam portion being positioned to create a second gap between the second root portion and the cam groove, and
  a connecting portion disposed between and formed continuously with the first cam portion and the second cam portion to create a space between the connecting portion and the cam groove, the first cam portion being positioned to create a first gap between the first root portion and the cam groove, and an external dimension of the first intermediate portion being substantially constant in the radial direction.

23. A lens barrel comprising:

a first support frame having a cam groove; and a second support frame having an annular main body with
- a cam follower extending outwardly from the main body in a radial direction and slidably disposed in the cam groove, the cam follower having
  - a first cam portion having a first contact portion and a first root portion, the first contact portion being in contact with the cam groove, the first root portion being disposed between the first contact portion and the main body, the first cam portion being positioned to create a first gap between the first root portion and the cam groove
  - a second cam portion in alignment with the first cam portion along the circumferential direction of the main body, the second cam portion having a second contact portion and a second root portion, the second contact portion being in contact with the cam groove, the second root portion being disposed between the second contact portion and the main body, the second root portion having a second base portion with a second inclined surface and a second intermediate portion, the second base portion extending outwardly from the main body in the radial direction, and the second intermediate portion connecting the second base portion and the second contact portion along the radial direction, the second cam portion being positioned to create a second gap between the second root portion and the cam groove, and
  - a connecting portion disposed between and formed continuously with the first cam portion and the second cam portion to create a space between the connecting portion and the cam groove, the second inclined surface being positioned at an angle relative to the radial direction so that the second gap is formed between the cam groove and the second base portion.

24. A lens barrel comprising:

a first support frame having a cam groove; and a second support frame having an annular main body with
- a cam follower extending outwardly from the main body in a radial direction and slidably disposed in the cam groove, the cam follower having
  - a first cam portion having a first contact portion and a first root portion, the first contact portion being in contact with the cam groove, the first root portion being disposed between the first contact portion and the main body, the first cam portion being positioned to create a first gap between the first root portion and the cam groove
  - a second cam portion in alignment with the first cam portion along the circumferential direction of the main body, the second cam portion having a second contact portion and a second root portion, the second contact portion being in contact with the cam groove, the second root portion being disposed between the second contact portion and the main body, the second root portion having a second base portion and a second intermediate portion, the second base portion extending outwardly from the main body in the radial direction, and the second intermediate portion connecting the second base portion and the second contact portion along the radial direction, the second cam portion being positioned to create a second gap between the second root portion and the cam groove, and
  - a connecting portion disposed between and formed continuously with the first cam portion and the second cam portion to create a space between the connecting portion and the cam groove, an external dimension of the second base portion gradually increases closer to the main body.

25. A lens barrel comprising:

a first support frame having a cam groove; and a second support frame having an annular main body with
- a cam follower extending outwardly from the main body in a radial direction and slidably disposed in the cam groove, the cam follower having
  - a first cam portion having a first contact portion and a first root portion, the first contact portion being in contact with the cam groove, the first root portion being disposed between the first contact portion and the main body, the first cam portion being positioned to create a first gap between the first root portion and the cam groove
  - a second cam portion in alignment with the first cam portion along the circumferential direction of the main body, the second cam portion having a second contact portion and a second root portion, the second contact portion being in contact with the cam groove, the second root portion being disposed between the second contact portion and the main body, the second root portion having a second base portion and a second intermediate portion, the second base portion extending outwardly from the main body in the radial direction, and the second intermediate portion connecting the second base portion and the second contact portion along the radial direction, the second cam portion being positioned to create a second gap between the second root portion and the cam groove, and
  - a connecting portion disposed between and formed continuously with the first cam portion and the second cam portion to create a space between the connecting portion and the cam groove, an external dimension of the second intermediate portion being substantially constant in the radial direction.

* * * * *